United States Patent
Mey et al.

(10) Patent No.: US 7,017,559 B2
(45) Date of Patent: Mar. 28, 2006

(54) METHOD FOR THE OPERATION OF A FUEL SYSTEM FOR AN LPG ENGINE

(75) Inventors: Jörn Mey, Mölln (DE); Andreas Kistner, Wächtersbach (DE); Andreas Firsching, Aschaffenburg (DE); Frank Wucherpfenning, Wolfenbüttel (DE); Joachim Seydell, Gifhorn (DE)

(73) Assignees: Linde AG, (DE); Still GmbH, (DE); Volkswagen AG, (DE)

( * ) Notice: Subject to any disclaimer, the term of this patent is extended or adjusted under 35 U.S.C. 154(b) by 148 days.

(21) Appl. No.: 10/794,574

(22) Filed: Mar. 5, 2004

(65) Prior Publication Data

US 2004/0231647 A1   Nov. 25, 2004

(30) Foreign Application Priority Data

Mar. 7, 2003   (DE) ................................ 103 10 151

(51) Int. Cl.
*F02B 44/00* (2006.01)
(52) U.S. Cl. ............... 123/527; 123/549; 123/198 DB; 701/112
(58) Field of Classification Search ................ 123/527, 123/27 GE, 543, 549, 550, 558, 198 D, 198 DB; 701/112
See application file for complete search history.

(56) References Cited

U.S. PATENT DOCUMENTS 5,076,245 A * 12/1991 Jones ......................... 123/527
2004/0182375 A1* 9/2004 Linna et al. ................ 123/679

* cited by examiner

*Primary Examiner*—Andrew M. Dolinar
*Assistant Examiner*—Katrina B. Harris
(74) *Attorney, Agent, or Firm*—The Webb Law Firm

(57) ABSTRACT

A method for operating a fuel system for an internal combustion engine operated with fuel gas. The fuel system has at least one electrically actuated shutoff valve (4) and at least one electrically operated heating device (14, 16). The operating method includes:

generating a signal to turn on the heating device (14, 16) when the internal combustion engine is turned on;

determining a heating demand ($\upsilon_{reference}$) of the fuel system when the heating device (14, 16) is turned on; and depending on the heating demand ($\upsilon_{reference}$) of the fuel system, determining a delay time between the time the heating device (14, 16) is turned on and the time the shutoff valve (4) is opened. The heating demand ($\upsilon_{reference}$) can be a function of a temperature ($T_{engine\ coolant}$) of the engine and/or a temperature ($T_{hydraulic\ fluid}$) independent of the engine and/or the current ($I_{heating}$) flowing through the heating device.

21 Claims, 2 Drawing Sheets

METHOD FOR THE OPERATION OF A FUEL SYSTEM FOR AN LPG ENGINE

CROSS REFERENCE TO RELATED APPLICATION

This application corresponds to German Application No. 103 10 151.9 filed Mar. 7, 2003, which is herein incorporated by reference in its entirety.

BACKGROUND OF THE INVENTION

1. Field of the Invention

This invention relates to a method for the operation of a fuel system for an internal combustion engine that is operated with fuel gas, the fuel system having at least one electrically actuated shutoff valve and at least one electrically operated heating device for the fuel gas.

2. Description of the Currently Available Technology

Internal combustion engines powered by fuel gas are frequently used in industrial trucks, such as fork-lift trucks, as well as in passenger vehicles. The fuel gas used for this application is typically referred to as liquid petroleum gas or LPG and consists primarily of propane and/or butane.

The fuel system of an internal combustion engine of this type comprises a fuel container in the form of a high-pressure gas bottle or a high-pressure tank, an evaporator, and a shutoff valve that is located upstream of the evaporator. In the evaporator, the fuel gas, which is typically stored in the form of a liquid, is depressurized and thereby transformed into a gas, wherein thermal energy is added to the fuel gas. After a relatively long period of operation of the internal combustion engine, this heat is generally derived from the coolant of the internal combustion engine. The fuel system also has at least one electrical heating element to provide at least approximately total evaporation of the fuel gas during cold starts of the internal combustion engine. The evaporator can also include a pressure regulator so that the fuel gas will be available at the output of the evaporator in the form of a gas at a defined pressure. An additional component of the fuel system located downstream of the evaporator is a mixer, the function of which corresponds to the carburetor or fuel injection system of a gasoline engine.

It is an object of the invention to provide a method for the operation of a fuel system which securely prevents the accumulation of critical amounts of liquid fuel gas downstream of the evaporator under substantially all operating conditions.

SUMMARY OF THE INVENTION

The invention teaches that the above object can be achieved by a process that includes one or more of the following steps.

When the internal combustion engine is started, a signal is generated to turn on the heating device. When the heating device is turned on, the demand for heat in the fuel system is determined at least once. Depending on the heating demand of the fuel system, a delay period is determined, which delay period must elapse between the time the heating device is turned on and the shutoff valve is opened. The internal combustion engine is turned on by an operator, for example by turning an ignition key or by pressing a starter button. After this starting action, the internal combustion engine is started using the automatic method described by the invention. For example, first the electrical heating device of the fuel system can be turned on. This heating device can be used, for example, to preheat an evaporator and an injection manifold of the fuel system. Simultaneously, on the basis of certain parameters, the heating demand of the fuel system can be determined, which can vary a great deal, in particular as a function of whether the startup of the internal combustion engine is a so-called cold start or a hot start. Depending on the heating demand determined, a delay period is determined, after the expiration of which the shutoff valve is opened and the fuel feed begins. The delay period thereby corresponds to a period of preheating for the fuel system.

The heating demand of the fuel system can be determined as a function of a measured temperature value of the internal combustion engine and/or as a function of a temperature value that is independent of the internal combustion engine and/or as a function of the electric current flowing through the heating device. The temperature value of the internal combustion engine can be the coolant temperature, for example. As a temperature value that is independent of the internal combustion, reference can be made to the temperature of a hydraulic system of the vehicle, for example, if the fuel system and internal combustion are part of an industrial truck that also has a hydraulic system. On the basis of these two measured temperature values, the operating conditions of the internal combustion engine and of the fuel system, their temperature level, and the temperature level of the environment can be accurately estimated, for which purpose the temperature sensors that are already present can also be used. However, it would also be possible to provide at least one additional temperature sensor. An additional input variable for the determination of the heating demand can be the electric current flowing through the heating device, which is itself a function of the battery voltage and also of the temperature of the heating device. That is the case in particular when the heating device has PTC (Positive Temperature Coefficient) heating elements, the internal resistance of which increases as the temperature increases. The testing of the electric current flowing through the heating device can be used for plausibility checks for safety purposes. Alternatively, the signal of a temperature sensor can be used for the same purpose.

The electric heating devise can also be turned off automatically. In that case, when a predetermined limit for the current temperature of the fuel system is exceeded, as determined from the heating demand of the fuel system, and/or when the level of the electric current flowing through the heating device drops below a specified limit, and/or when a defined maximum operating time of the heating device is exceeded, a signal can be generated to turn off the heating device. The total power consumption of the heating device can, therefore, be limited. It simultaneously becomes possible to ensure that the heating device is not operated unnecessarily when the fuel system is already sufficiently hot.

The delay period mentioned above can also be determined as a function of the electric current flowing through the heating device and/or as a function of the voltage of a vehicle battery. The calculation of the delay period therefore also includes variables from which the instantaneous heat output of the electrical heating device can be derived.

The progress of the delay period can be indicated by a signaling device, for example by a light. The operator is thereby informed that the internal combustion engine can now be started by actuating the starter.

As a function of the heating demand of the fuel system and/or as a function of the voltage of the vehicle battery and/or as a function of the electric current flowing through the heating device, a cycle time and/or a cycle frequency for a one-time or repeated opening of the shutoff valve can be determined. In particular, in the event of a cold start of the internal combustion engine, the shutoff valve can be initially opened only briefly for the duration of the cycle time, so that only a limited quantity of fuel gas is admitted into the evaporator. For a hot start of the internal combustion engine, the cycle time can be set to zero, which then causes the shutoff valve to open and remain open.

The shutoff valve can be opened again if, after the expiration of the cycle time, the speed of the internal combustion engine exceeds the speed of the starter. Only when the internal combustion engine is running by itself is fuel gas fed to the engine continuously.

The shutoff valve can remain open if, after a waiting time, the speed of the internal combustion engine exceeds a defined starter release speed. The starter release speed is not reached, for example, if the internal combustion engine is not running on all cylinders. In that case, the shutoff valve is closed again and the attempted start is terminated.

When the internal combustion engine is turned off, there should be no remaining fuel gas in the parts of the fuel system downstream of the shutoff valve. This requirement can be achieved by a gas failure shutdown, whereby when the running internal combustion engine is shut down, a signal is generated to close the shutoff valve. The stopping time of the internal combustion engine after the closing of the shutoff valve is determined and an error signal is generated if the stopping time exceeds a specified limit. In this manner, the function of the shutoff valve can be verified, because an excessively long stopping time indicates that the shutoff valve is stuck open. If an error signal is generated, then optionally and additionally, the internal combustion engine can be prevented from restarting as a function of a temperature level.

BRIEF DESCRIPTION OF THE DRAWINGS

Additional advantages and details of the invention are described below with reference to the exemplary embodiment illustrated in the accompanying schematic figures, in which.

DESCRIPTION OF THE PREFERRED EMBODIMENTS

Figure 1:
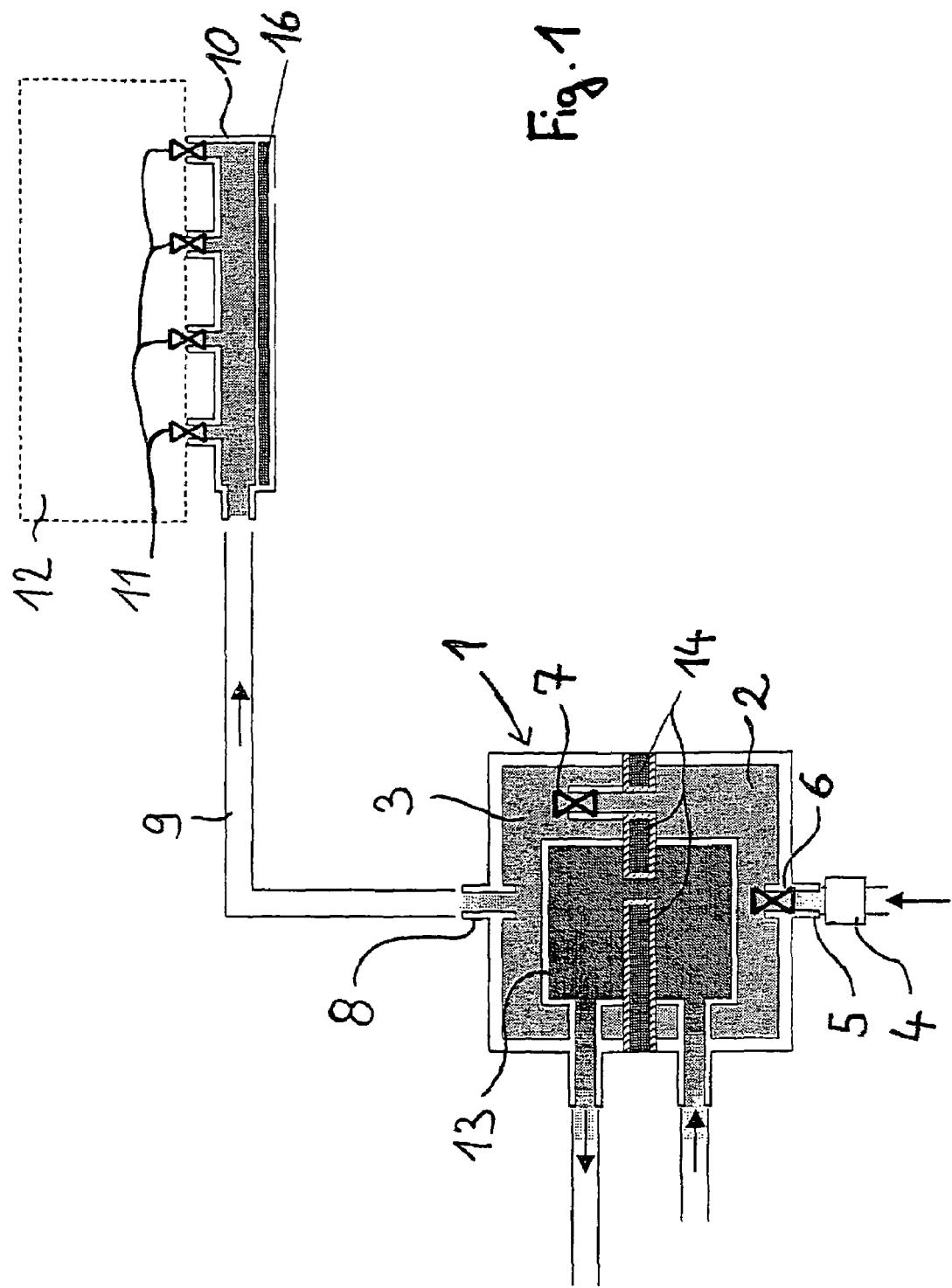
FIG. 1 shows a fuel system for an LPG engine.

FIG. 1 shows a fuel system for an internal combustion engine that is operated with liquid petroleum gas (LPG). An evaporator 1 has a first evaporator chamber 2 and a second evaporator chamber 3. A high-pressure tank (not shown) for the fuel gas is connected via an electrically actuated shutoff valve 4 to an output 5 of the evaporator 1. In the vicinity of the input 5, there is a first valve 6 at which the fuel gas is depressurized and thereby at least partly transformed into the gas phase. By means of a second valve 7, the fuel gas gets into the second evaporator chamber 3 and is thereby transformed approximately completely into the gas phase. An output 8 in flow communication with the second evaporator chamber 3 connects the evaporator 1 by means of a line 9 with an injection manifold 10. On the injection manifold 10 there are valves 11, by means of which the fuel gas is injected directly or indirectly via an air intake duct into the combustion chambers of an internal combustion engine 12.

During the evaporation, the fuel gas absorbs thermal energy from its environment, which thermal energy is supplied to the evaporator 1 by means of a first heating device 13 and/or a second heating device 14. The first heating device 13 can be coupled to a cooling circuit of the internal combustion engine 12. The second heating device 14 can be heated with electrical energy and can, therefore, be operated regardless of the condition of the internal combustion engine 12. Heat can be generated by the second heating device 14 by means of a PTC heater element, the temperature of which can be automatically regulated to a preset value. A third heating device 16 can be used to heat the injection manifold 10 and can also be equipped with a PTC heating element.

With the two electrically operated heating devices 14, 16, it can be guaranteed that the fuel gas will be completely evaporated in the evaporator 1 and will not re-condense, even at temperatures conventionally considered to be cold ambient temperatures and/or cold internal combustion engines.

Figure 2:
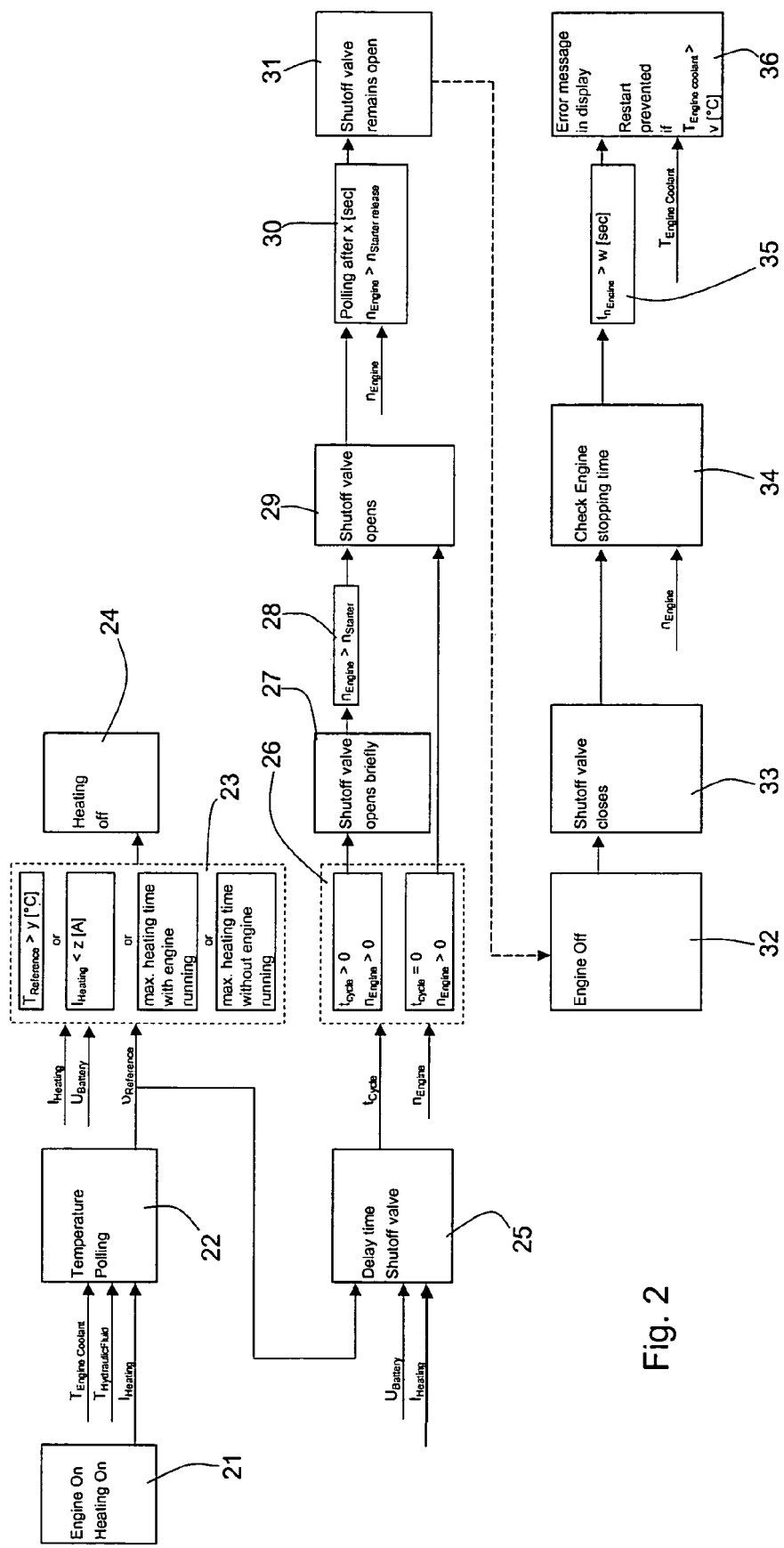
FIG. 2 is a flow diagram of a method for operating the fuel system incorporating features of the invention.

A method for the operation of a fuel system of the invention is described in greater detail below with reference to FIG. 2 and ensures that, even during the starting of the internal combustion engine, no liquid fuel gas or very little liquid fuel gas collects in the fuel system.

At the time indicated by the number 21, the operator gives the signal to turn on the internal combustion engine. The engine can be started, for example, by turning an ignition key or by pressing a starter button. At this point, the electrically operated heating device (FIG. 1, Nos. 14, 16) of the fuel system is turned on automatically. To determine the heating demand $\upsilon_{reference}$ for the electrical heating device (FIG. 1, Nos. 14, 16), an arithmetic element 22 is informed of the electric current $I_{heating}$ that is instantaneously flowing through the heating device (FIG. 1, Nos. 14, 16), whereby $I_{heating}$ includes the currents through the first and the second heating devices (14 and 16). Additional input variables for the determination of the heating demand $\upsilon_{reference}$ are the current coolant temperature $T_{engine\ coolant}$ of the internal combustion engine and/or the current hydraulic fluid temperature $T_{hydraulic\ fluid}$ of a hydraulic system and/or of an additional temperature sensor.

As soon as one of the conditions 23 is satisfied, the heating device (FIG. 1, Nos. 14, 16) is turned off again at the time 24. That happens if a calculated temperature value of the evaporator $T_{reference}$ derived from the heating demand $\upsilon_{reference}$ is greater than a limit y which itself corresponds to the calculated temperature value of the heating element (FIG. 1, Nos. 14, 16) itself. Likewise, the heating device (FIG. 1, Nos. 14, 16) shuts off automatically if the current $I_{heating}$ drops below a specified limit of z Amperes. The value z can thereby be fixed or can be defined as a variable that varies as a function of the battery voltage, for example. The heating is also shut off if a maximum heating time is exceeded while the engine is running, or a maximum heating time while the engine is stopped.

Depending on the current heating demand $\upsilon_{reference}$, a delay period for the opening of the shutoff valve (FIG. 1, No. 4) is calculated in the arithmetic element 25. Additional input variables for the calculation of the delay time are the battery voltage $U_{battery}$ of the vehicle battery and the current $I_{heating}$. The delay time corresponds to the preheating of the fuel system by the electrical heating element until the internal combustion engine can be started. A cycle time $t_{cycle}$ is also determined in the arithmetic element 25, which specifies how long the shutoff valve (FIG. 1, No. 4) is opened for the first time.

In the following logic element 26, after the expiration of the delay time, a verification is performed to determine whether the speed $n_{engine}$ of the internal combustion engine is greater than zero, i.e., whether the engine is being driven by a starter. If that is the case, a decision is made as a function of the value of the cycle time $t_{cycle}$ whether the shutoff valve (FIG. 1, No. 4) is opened only briefly or permanently. If $t_{cycle}=0$, which corresponds to a hot start of the internal combustion engine, the shutoff valve (FIG. 1, No. 4) is opened in Step 29. If $t_{cycle}>0$, which corresponds to a cold start of the internal combustion engine, the shutoff valve (FIG. 1, No. 4) is opened only briefly in Step 27. Then, a verification is performed in the element 28 whether the engine speed $n_{engine}$ is greater than the starter speed $n_{starter}$, which means that the engine has started. In that case, there is also a transition to Step 29, i.e., the shutoff valve (FIG. 1, No. 4) is opened.

An additional inquiry is made in Step 30 to determine whether the internal combustion engine has reached its idle speed. For this purpose, the current engine speed $n_{engine}$ is compared with a defined starter release speed $n_{starter\ release}$. If the engine speed $n_{engine}$ is greater, the shutoff valve (FIG. 1, No. 4) is opened in Step 31.

The fuel system remains in this status until the operator, at time 32, generates a signal to turn off the internal combustion engine, for example by turning off the ignition key or by pressing a "stop" button. A gas failure shutdown of the internal combustion engine is initiated, whereby in Step 33 the shutoff valve (FIG. 1, No. 4) is closed. On the basis of the engine speed $n_{engine}$, the stopping time $t_{n\ engine}$ of the internal combustion engine is then determined in Step 34, and is compared with a defined limit value w in Step 35. If the stopping time $t_{n\ engine}$ is greater than 2, that means that the shutoff valve is not completely closed and, therefore, unwanted fuel gas is continuing to flow into the evaporator. If that is the case, an error message is generated in Step 36 and the restarting of the internal combustion engine is prevented as a function of a reference temperature, e.g., $T_{engine\ coolant}$, because the fuel gas that continues to flow through the open shutoff valve might re-condense downstream of the evaporator, which could result in an unsafe operating condition. In that case, the internal combustion engine can only be restarted if $T_{engine\ coolant}$ is equal to or less than the stored reference value v.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A method for operating a fuel system for an internal combustion engine that is operated with fuel gas, the fuel system comprising at least one electrically actuated shutoff valve and at least one electrically operated heating device for the fuel gas, the method comprising:
   generating a signal to turn on the at least one heating device when the internal combustion engine is turned on;
   determining a heating demand ($\upsilon_{reference}$) of the fuel system at least once when the at least one heating device is turned on; and
   determining a delay time between the time the at least one heating device is turned on and the time the shutoff valve is opened based on the heating demand ($\upsilon_{reference}$) of the fuel system.

2. The method as claimed in claim 1, further including determining the heating demand ($\upsilon_{reference}$) of the fuel system as a function of at least one of a measured temperature ($T_{engine\ coolant}$) of the internal combustion engine and/or as a function of a measured temperature ($T_{hydralic\ fluid}$) that is independent of the internal combustion engine and/or as a function of an electric current ($I_{heating}$) that is flowing through the at least one heating device.

3. The method as claimed in claim 1, further including generating a signal to turn off the at least one heating device when a specified limit (y) for the current temperature ($T_{reference}$) of the fuel system, which is determined from the heating demand ($\upsilon_{reference}$) of the fuel system, is exceeded, and/or when an electric current ($I_{heating}$) that is flowing through the at least one heating device falls below a specified limit (z), and/or when a defined maximum operating time of the at least one heating device is exceeded.

4. The method as claimed in claim 1, including determining the delay time as a function of a current ($I_{heating}$) that is flowing through the at least one heating device and/or as a function of a voltage ($U_{battery}$) of a vehicle battery.

5. The method as claimed in claim 1, including indicating the expiration of the delay time by a signaling device.

6. The method as claimed in claim 1, including determining a cycle time ($t_{cycle}$) and/or a cycle frequency for opening the shutoff valve as a function of the heating demand ($\upsilon_{reference}$) of the fuel system and/or as a function of a voltage ($U_{battery}$) of a vehicle battery and/or as a function of a current ($I_{heating}$) that is flowing through the at least one heating device.

7. The method as claimed in claim 6, including reopening the shutoff valve when, after expiration of the cycle time ($t_{cycle}$), a speed ($n_{engine}$) of the internal combustion engine exceeds a speed ($n_{starter}$) of a starter.

8. The method as claimed in claim 6, wherein the shutoff valve remains open if, after a waiting period, a speed ($n_{engine}$) of the internal combustion engine exceeds a defined starter release speed ($n_{starter\ release}$).

9. The method as claimed in claim 2, further including generating a signal to turn off the at least one heating device when a specified limit (y) for the current temperature ($T_{reference}$) of the fuel system, which is determined from the heating demand ($\upsilon_{reference}$) of the fuel system, is exceeded, and/or when an electric current ($I_{heating}$) that is flowing through the at least one heating device falls below a specified limit (z), and/or when a defined maximum operating time of the at least one heating device is exceeded.

10. The method as claimed in claim 2, including determining the delay time as a function of a current ($I_{heating}$) that is flowing through the at least one heating device and/or as a function of a voltage ($U_{battery}$) of a vehicle battery.

11. The method as claimed in claim 3, including determining the delay time as a function of a current ($I_{heating}$) that is flowing through the at least one heating device and/or as a function of a voltage ($U_{battery}$) of a vehicle battery.

12. The method as claimed in claim 2, including indicating the expiration of the delay time by a signaling device.

13. The method as claimed in claim 3, including indicating the expiration of the delay time by a signaling device.

14. The method as claimed in claim 4, including indicating the expiration of the delay time by a signaling device.

15. The method as claimed in claim 2, including determining a cycle time ($t_{cycle}$) and/or a cycle frequency for opening the shutoff valve as a function of the heating demand ($v_{reference}$) of the fuel system and/or as a function of a voltage ($U_{battery}$) of a vehicle battery and/or as a function of a current ($I_{heating}$) that is flowing through the at least one heating device.

16. The method as claimed in claim 3, including determining a cycle time ($t_{cycle}$) and/or a cycle frequency for opening the shutoff valve as a function of the heating demand ($v_{reference}$) of the fuel system and/or as a function of a voltage ($U_{battery}$) of a vehicle battery and/or as a function of a current ($I_{heating}$) that is flowing through the at least one heating device.

17. The method as claimed in claim 4, including determining a cycle time ($t_{cycles}$) and/or a cycle frequency for opening the shutoff valve as a function of the heating demand ($v_{reference}$) of the fuel system and/or as a function of a voltage ($U_{battery}$) of a vehicle battery and/or as a function of a current ($I_{heating}$) that is flowing through the at least one heating device.

18. The method as claimed in claim 5, including determining a cycle time ($t_{cycle}$) and/or a cycle frequency for opening the shutoff valve as a function of the heating demand ($v_{reference}$) of the fuel system and/or as a function of a voltage ($U_{battery}$) of a vehicle battery and/or as a function of a current ($I_{heating}$) that is flowing through the at least one heating device.

19. The method as claimed in claim 7, wherein the shutoff valve remains open if, after a waiting period, a speed ($n_{engine}$) of the internal combustion engine exceeds a defined starter release speed ($n_{starter\ release}$).

20. The method as claimed in claim 5, wherein the signaling device is a lamp.

21. A method for operation of a fuel system for an internal combustion engine that is operated with fuel gas, the fuel system comprising at least one electrically actuated shutoff valve, the method comprising:
   generating a signal to close the shutoff valve when the running internal combustion engine is turned off;
   measuring a stopping time ($t_{n\ engine}$) of the internal combustion engine after closing the shutoff valve; and
   generating an error signal when the stopping time ($t_{n\ engine}$) exceeds a specified limit (w).

* * * * *